(12) United States Patent
Chronister et al.

(10) Patent No.: US 9,879,527 B2
(45) Date of Patent: Jan. 30, 2018

(54) SYSTEMS AND METHODS FOR DOUBLE DATA RATE COMMUNICATION VIA POWER CABLE

(71) Applicant: Baker Hughes Incorporated, Houston, TX (US)

(72) Inventors: Vernon Chronister, Tulsa, OK (US); Stephen J. Coulston, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 814 days.

(21) Appl. No.: 14/481,328

(22) Filed: Sep. 9, 2014

(65) Prior Publication Data

US 2016/0069179 A1    Mar. 10, 2016

(51) Int. Cl.
| | |
|---|---|
| *E21B 47/12* | (2012.01) |
| *F04B 47/00* | (2006.01) |
| *F04B 47/06* | (2006.01) |
| *E21B 43/12* | (2006.01) |
| *E21B 47/00* | (2012.01) |
| *H04B 13/02* | (2006.01) |

(52) U.S. Cl.
CPC .......... *E21B 47/122* (2013.01); *E21B 43/128* (2013.01); *E21B 47/0007* (2013.01); *E21B 47/12* (2013.01); *F04B 47/00* (2013.01); *F04B 47/06* (2013.01); *H04B 13/02* (2013.01)

(58) Field of Classification Search
CPC .. E21B 47/122; E21B 43/128; E21B 47/0007; E21B 47/12; F04B 47/00; F04B 47/06; H04B 13/02; H04B 2203/5466; H04B 2203/5475; H04B 3/54
See application file for complete search history.

(56) References Cited

U.S. PATENT DOCUMENTS

| | | | |
|---|---|---|---|
| 5,394,410 A * | 2/1995 | Chen | .......... H04L 1/08 714/823 |
| 6,587,037 B1 | 7/2003 | Besser | |
| 2012/0331195 A1* | 12/2012 | Pipho | .......... G06F 13/364 710/110 |

* cited by examiner

*Primary Examiner* — Nay Tun
(74) *Attorney, Agent, or Firm* — Law Offices of Mark L. Berrier

(57) ABSTRACT

Systems and methods for communicating messages over a three-phase power cable between surface equipment and downhole equipment in a well. A transmitter parses messages into data bit pairs and generates a parity bit for each pair (a triplet). The bits of each triplet are concurrently but separately transmitted over the power cable. Each triplet is received from the power cable by a receiver and is decoded to identify the data bits. The receiver may verify the received bits and/or recover a lost bit in each triplet. The data bits are then reconstructed into the original message. Since each triplet has two bits, the effective data rate is twice the data rate of transmitting a single bit at a time. The parity bit enables recovery of data with a bit error rate of up to 1 in 3.

19 Claims, 4 Drawing Sheets

SYSTEMS AND METHODS FOR DOUBLE DATA RATE COMMUNICATION VIA POWER CABLE

BACKGROUND

Field of the Invention

The invention relates to systems for communication between surface and downhole equipment in a well, and more particularly to systems and methods for reliably communicating data between surface and downhole equipment over a three-phase power cable, where two data bits and an associated error correction bit are concurrently transmitted on the different conductors for the three different phases.

Related Art

Artificial lift systems such as pumps may be used to produce fluids (e.g., oil) from wells. Electric submersible pumps "ESP's" are commonly used for this purpose. The ESP may be coupled to the end of tubing that can then be used to lower the ESP into the well. The ESP is positioned so that it is located in a portion of the well bore where fluid from the surrounding geological formation flows into the well.

Gauges (sensor packages) can be attached at the bottom of the ESP system to allow various parameters (e.g., motor temperature, fluid temperature, fluid pressure, etc.) to be monitored and communicated to equipment at the surface of the well. In order to make use of the information obtained through the gauges, it is necessary to be able to communicate this information from the gauges downhole in the well to the surface of the well, where display, data collection and control systems for the ESP system are located.

This information can be communicated, for example, via dedicated communication lines or via "comms on" transmissions over the power cable. In comms on power systems, data transmissions are impressed upon the power cable so that a dedicated data line is not necessary. There are a variety of techniques for transmitting data over power cables that range from simple low frequency current loop techniques to more complex methodologies, such as orthogonal frequency division multiplexing (OFDM).

Over time, the effects of fluids and the well environment cause the performance of the communication system in a well to degrade. Bit errors can occur singly, repetitively, or in bursts. The more the system degrades, the more likely it is that repetitive bit errors will occur. This may increase the likelihood of random and repetitive noise and, at some point, effective communication of data between the downhole equipment (e.g., ESP) and the surface equipment can be lost. This may occur well before the operation of the ESP is affected. When the system is operated without the benefit of information obtained through monitoring, the system may suffer damage and downtime that could have been avoidable if the information were available.

Conventional comms on power protocols cannot handle a single bit error in an entire message. Currently, the total number of bits in a comms on power message can exceed 100 bits, and if just one error occurs, the entire message is discarded as being corrupted. It would therefore be desirable to provide means to enable a comms on power communication system to continue function effectively despite degradation that may result in one or more bit errors in received comms on power messages.

SUMMARY OF THE INVENTION

This disclosure is directed to systems and methods for reliably communicating data between surface and downhole equipment over a power cable. In particular, the systems and methods use forward error correction to enable the reliable communication of comms on power messages over a three-phase power cable despite the occurrence of one or more bit errors in the messages. This is achieved by parsing the bits of the messages into pairs, generating an error correction (parity) bit for each pair of data bits, and concurrently transmitting the three bits (the two data bits and one parity bit) separately on the three phases of the power cable. When the three bits are received, the two data bits can be determined, even if one of the three bits is lost. This allows automatic detection and correction to a bit error rate of one in three, instead of zero in 100.

By sending two data bits over the power cable at the same time, the present systems double the data rate of a conventional system that sends a single bit at a time. Utilizing parity as forward error correction (FEC) allows communication errors to be detected and automatically corrected. This doubling of the data transmission rate is therefore achieved without the problems caused by increased attenuation over time, and the noise susceptibility this causes. In systems operating at the limit of communication speed due to electrical and noise issues, this is the only way to increase the effective data rate. Forward error correction information is generated for the specific data that is transmitted, but is not itself part of the message. Sending the forward error correction information (e.g., a parity bit) on a separate phase conductor simultaneously with the data bits does not increase the overhead of the message and does not slow down the effective data rate, but significantly increases the reliability of the communication.

One embodiment of the invention is a system for communicating comms on power messages between surface equipment and downhole equipment in a well. The system includes equipment positioned at the surface of the well and equipment positioned downhole in the well, with a power cable coupled between them. The power cable has three conductors configured to transmit three-phase power from the surface equipment to the downhole equipment. The system also has at least one transmitter and at least one receiver, each of which is coupled to the power cable. The transmitters and receivers may be positioned to communicate information from the downhole equipment to the surface equipment, from the surface equipment to the downhole equipment, or in both directions.

The transmitter receives comms on power messages that are to be communicated and parses the messages into data bit pairs. For each bit pair, a parity bit is generated. These three bits are then concurrently transmitted on separate conductors of the power cable. The receiver decodes each triplet and identifies the two data bits. If a bit is lost, the missing bit is recovered by matching the successfully transmitted bits to one of the valid bit patterns. As the data bits of each triplet are received and identified, they are combined with other received data bits to reconstruct the original comms on power message. The system may be configured to synchronize the transmitter and the receiver prior to communicating a comms on power message. This may include transmitting predetermined bit patterns power cable and identifying which conductors of the power cable carry the first, second and parity bits based on a comparison of the received bits with the predetermined patterns.

An alternative embodiment may include only the transmitter, rather than the entire system. The transmitter may be configured to perform the parsing, encoding, transmission and synchronization functions described above. Another alternative embodiment may include only the receiver, which may be configured to perform the decoding, verification, recovery, reconstruction and synchronization functions described above. Yet another alternative embodiment may comprise a transceiver that includes the functions of both the transmitter and receiver. Still another embodiment may comprise a method that includes the steps performed by the transmitter and/or receiver.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
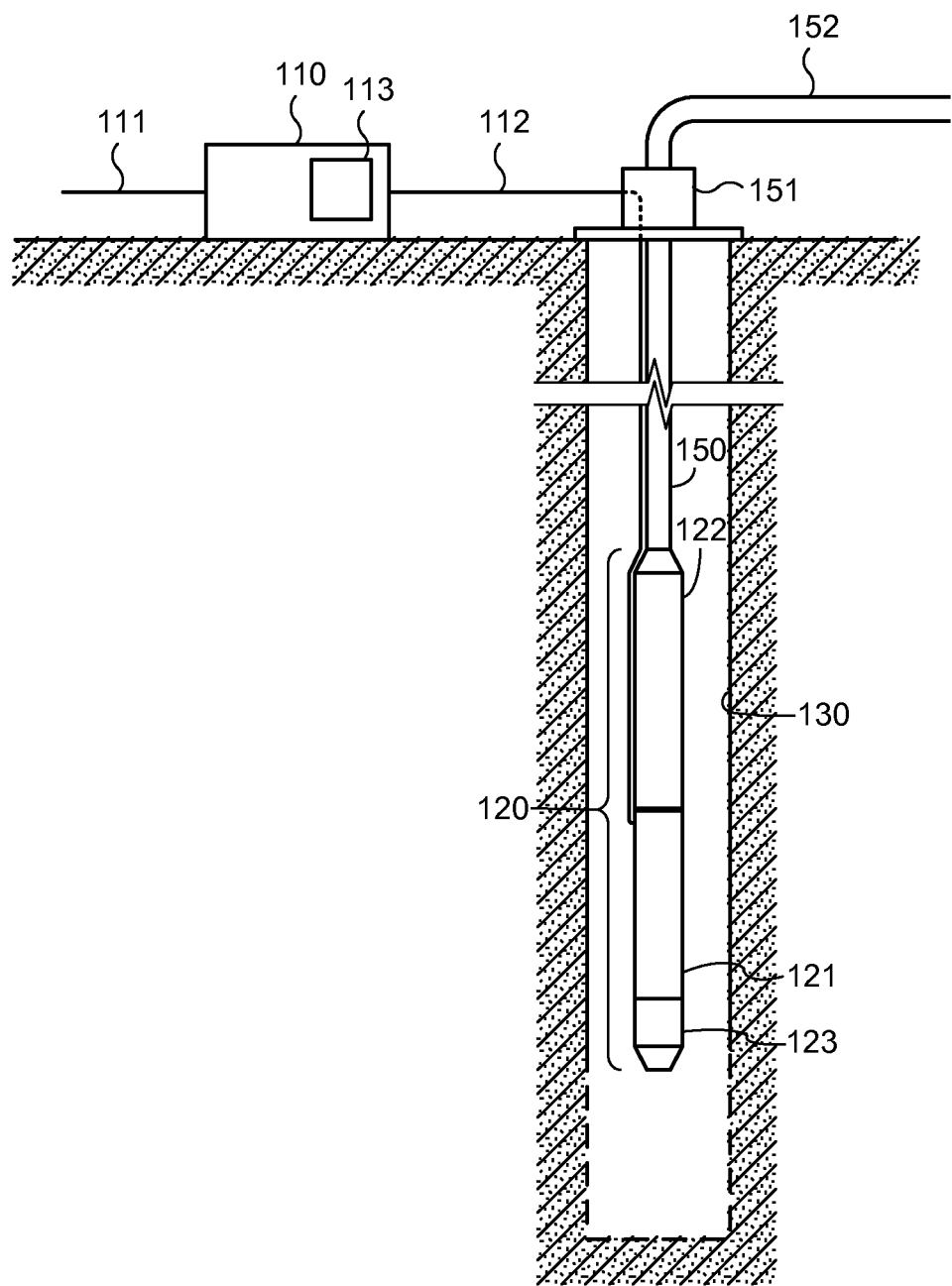
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for communicating data between surface and downhole equipment over a three-phase power cable, where two data bits and an associated error correction bit are concurrently transmitted on the different conductors for the three different phases.

In one embodiment, a system includes a three-phase power cable coupled between a control system at the surface of a well, and downhole equipment such as an ESP which is positioned in the well. The system is capable of concurrently communicating different bits of data separately over each of the three conductors of the power cable. The data may be communicated in one direction, or bidirectionally.

When a comms on power message is to be transmitted, the message is parsed into pairs of data bits. For each pair of data bits, a corresponding parity bit is generated. These three bits may be referred to collectively herein as a "triplet". For each triplet, the bits of the triplet are transmitted concurrently over the three conductors of the power cable. "Concurrently", as used herein, means that the bits are transmitted within a single period, but not necessarily simultaneously. Thus, the three bits of a first triplet are transmitted, then the three bits of a second triplet are transmitted, and so on.

When the three bits of a triplet are received at the other end of the power cable, the bits are examined, and the data bits are identified. If one of the bits of the triplet is lost in the transmission over the power cable, the lost bit is determined from the two bits that are received. The data bits of each successive triplet are then concatenated to reconstruct the original comms on power message. It should be noted that a known data sequence can be transmitted to enable the receiving device to determine which bits of the received triplets are the data bits, and which are the parity bits. Exemplary embodiments will be described in more detail below.

It should be noted that "bit" is used in this document to represent the equivalent of the smallest piece of information the system utilizes. It does not imply the electrical nature of the signal, or even that it is binary data. For analysis purposes, the data is depicted and deciphered as if it was binary data.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated at the lower end of the well to allow oil to flow from the formation into the well. Electric submersible pump 120 is coupled to the end of tubing string 150, and the pump and tubing string are lowered into the wellbore to position the pump in a producing portion of the well (as indicated by the dashed lines at the bottom of the wellbore). A control system 110 which includes a variable speed drive is positioned at the surface of the well. Control system 110 is coupled to pump 120 by power cable 112, which runs down the wellbore along tubing string 150.

Pump 120 includes an electric motor section 121 and a pump section 122. A gauge package 123 is attached to the bottom of motor section 121. (Pump 120 may include various other components which will not be described in detail here because they are well known in the art and are not important to a discussion of the invention.) Motor section 121 is operated to drive pump section 122, which actually pumps the oil through the tubing string and out of the well. In this embodiment, motor section 121 uses an electric motor which is driven by the variable speed drive. The variable speed drive receives AC (alternating current) input power from an external source such as a generator (not shown in the figure) via input line 111. The drive rectifies the AC input power and then produces three-phase AC output power that is suitable to drive motor section 121 of pump 120. This output power is provided to motor section 121 via power cable 112.

Control system 110 and gauge package 123 include transmitters and/or receivers for communicating information between the control system and the pump system. The system may have one transmitter and one receiver configured to provide one-way communications, it may have two sets of transmitters and receiver, each configured to provide one-way communications (one surface-to-downhole and one downhole-to-surface), or it may have transceivers to provide two-way communications. For purposes of simplicity, the descriptions of the following embodiments include components referred to as transceivers—these components should be construed as including transmitters and receivers for one-way communications as well as transceivers for two-way communications.

The system may, for example, include gauge package 123 which includes sensors that measure various physical parameters that need to be communicated to control system 110, and the control system may generate control information that needs to be communicated to the gauge package and/or pump system to control their operation. In this embodiment, the transceivers are each coupled to power cable 112 and communicate over the power cable using signals and protocols that do not interfere with the transmission of power from the variable speed drive to the pump system.

Figure 2:
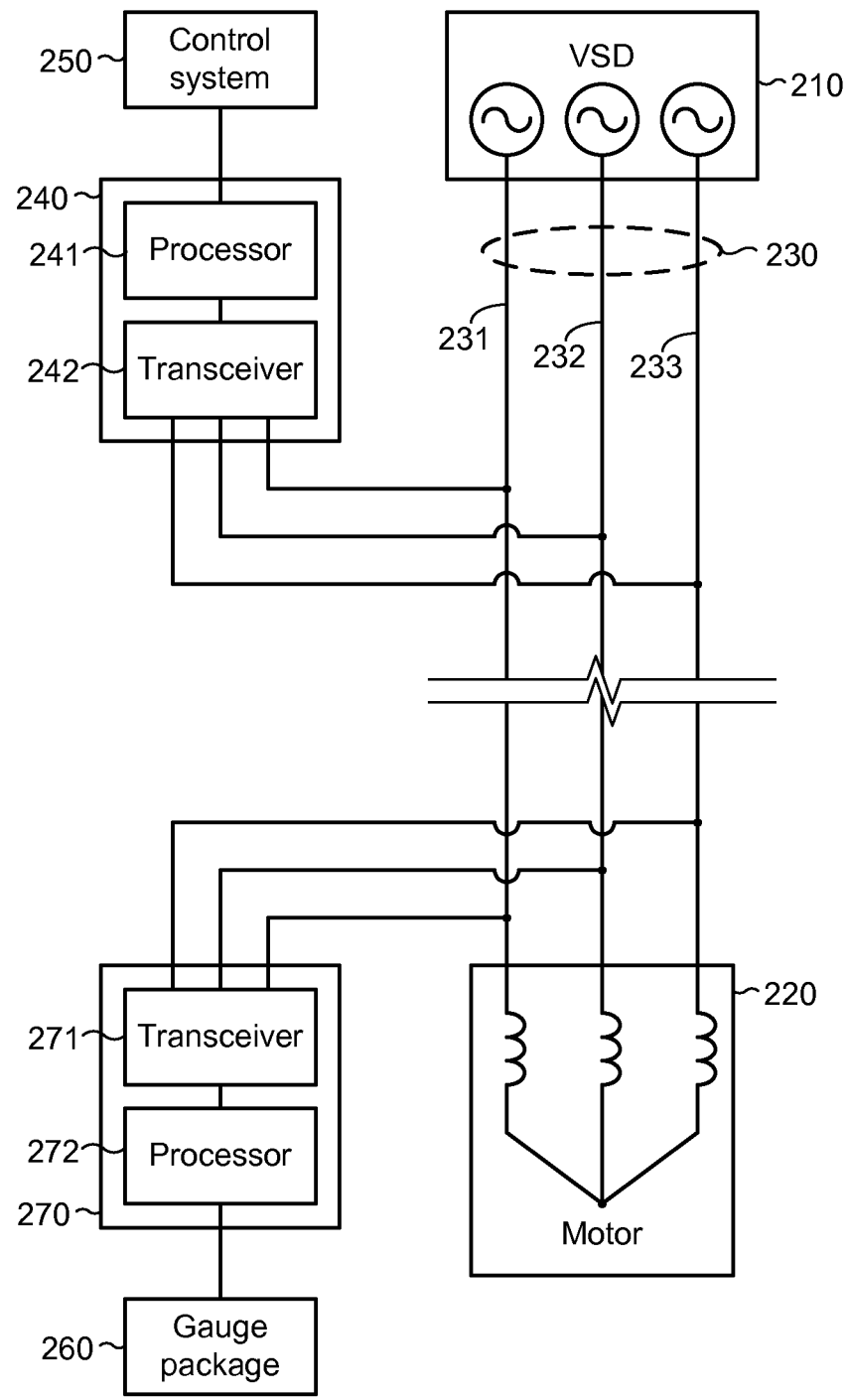
FIG. 2 is a functional block diagram illustrating the structure of an exemplary communication system in accordance with one embodiment.

Referring to FIG. 2, a functional block diagram illustrating the structure of an exemplary communication system in accordance with one embodiment is shown. In this embodiment, a variable speed drive 210 at the surface of a well receives power from an external power source and converts this power to three-phase AC power that is suitable to drive ESP motor 220. Variable speed drive 210 is coupled to ESP motor 220 by a power cable 230. Power cable 230 has three separate conductors (231-233), each of which carries a different one of the three phases of the variable speed drive's output power.

A surface component 240 of the communication system includes a processor 241 and a transceiver 242. Surface component 240 receives data from a control system 250 for communication to the downhole equipment (e.g., motor 220 or gauge 260). Processor 241 generates a comms on power message and parses the message into pairs of data bits. Processor 241 then generates a parity bit for each of the data bit pairs to form a three-bit triplet, which is provided to transceiver 242.

It should be noted that, although the processor in this embodiment is incorporated into the surface component 240 of the communication system, it could alternatively be a part of the surface equipment (e.g., a surface control system), rather than the communication system. Similarly the processor that is incorporated into downhole component 270 of the communication system (as described below) may alternatively be part of the downhole equipment (e.g., the motor or gauge package).

Transceiver 242 is coupled to conductors 231-233 of power cable 230. Transceiver 242 impresses each bit of the triplet received from processor 241 on a different one of conductors 231-233. The first bit is impressed on an "A" phase conductor, the second bit is impressed on a "B" phase conductor, and the parity bit is impressed on a "C" phase conductor. "Impress" is used herein to refer to the combining of the data signal with the power signal.

As will be explained in more detail below, the receiving components of the communication system may be capable of identifying which conductors carry the A, B and C phases, so it is not necessarily important that the first, second or parity bit be impressed on a specific one of the conductors. It is important, however, that the first bit of each triplet be transmitted on a first one of the conductors, the second bit of each triplet be transmitted on a second one of the conductors, and the third bit of each triplet be transmitted on a third one of the conductors.

The bits that are impressed on power cable 230 by surface component 240 are received by a downhole component 270 of the communication system. Downhole component 270 includes a transceiver 271 and a processor 272. Transceiver 271 detects the bits of each triplet and provides them to processor 272. Processor 272 examines the bits and decodes the data bits from the triplet. If a single bit of a triplet is lost in transmission over the power cable, processor 272 recovers the lost bit (as will be explained in more detail below) and then decodes the triplet to identify the data bits. As the data bits of successive triplets are decoded, processor 272 concatenates the data bits to reconstruct the comms on power message. The reconstructed comms on power message is then provided by processor 272 to gauge 260, motor 220, or other equipment, as appropriate.

Figure 5:
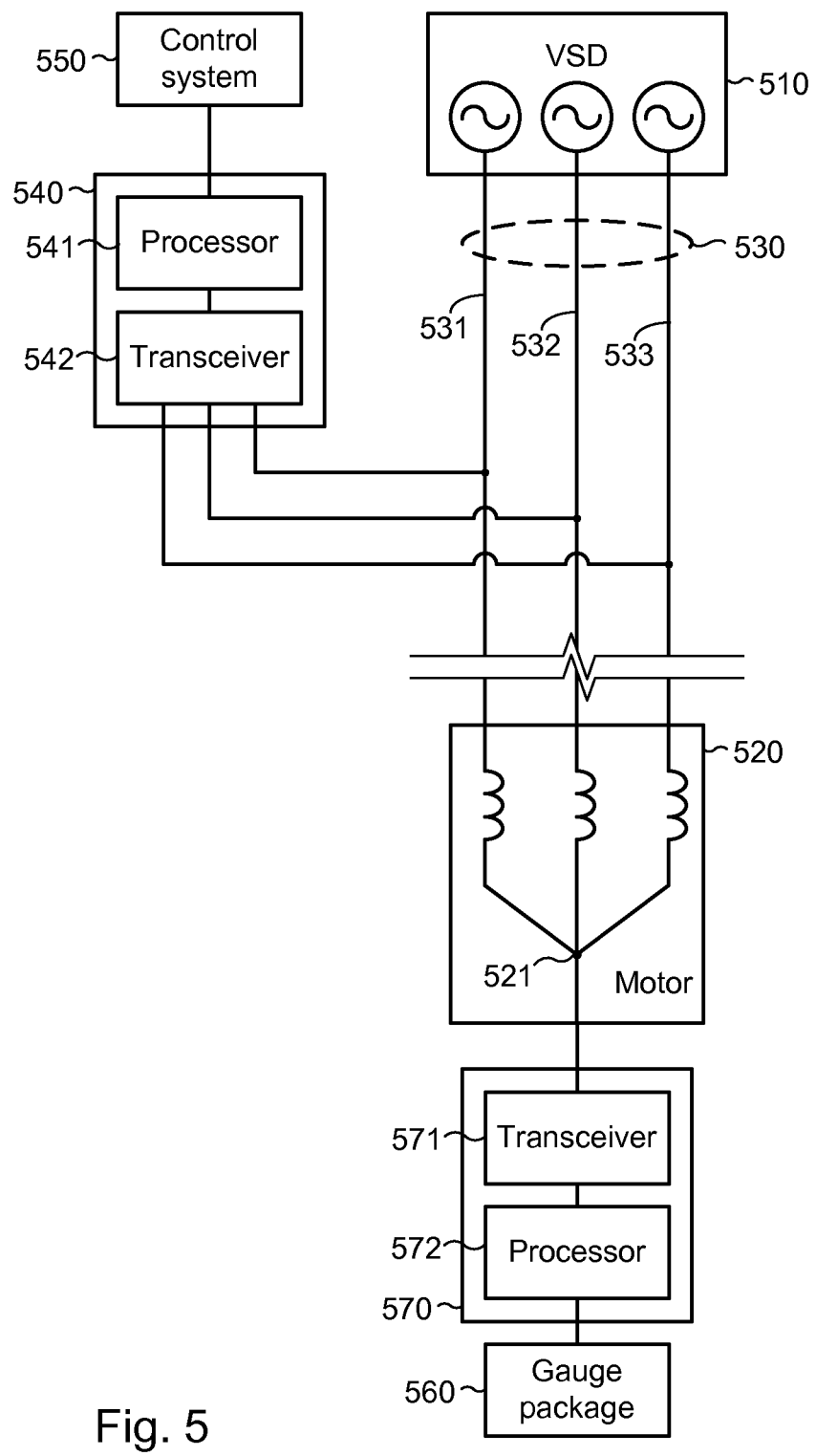
FIG. 5 is a functional block diagram illustrating the structure of a communication system in accordance with an alternative embodiment.

Referring to FIG. 5, a functional block diagram illustrating the structure of a communication system in accordance with an alternative embodiment is shown. In this embodiment, a variable speed drive 510 provides three-phase AC power to ESP motor 520 via a power cable 530. Power cable 530 has three separate conductors (531-533) which carry the three phases of the output power from the variable speed drive.

A surface component 540 of the communication system includes a processor 541 that receives data from a control system 550, and a transceiver 542 that communicates the data to the downhole equipment. Processor 541 generates a comms on power message, parses the message into pairs of data bits, and generates a parity bit for each of the data bit pairs. Transceiver 542 impresses the three bits on the three corresponding conductors 531-533.

In this embodiment, the downhole component 570 of the communication system is coupled to the Y-point 521 (also referred to as the wye-point) of motor 520. Downhole component 570 includes a transceiver 271 that distinguishes the three different bits that are communicated over the power cable, and provides these bits to 572. In one embodiment, the different bits may be represented by different frequencies, allowing transceiver 571 to distinguish them at the Y-point. Processor 572 examines and decodes the bits, verifying and/or reconstructing the bits of the triplet. As the data bits of successive triplets are decoded, processor 572 concatenates the data bits to reconstruct the comms on power message, and then provides the reconstructed message to gauge 560.

Figure 3:
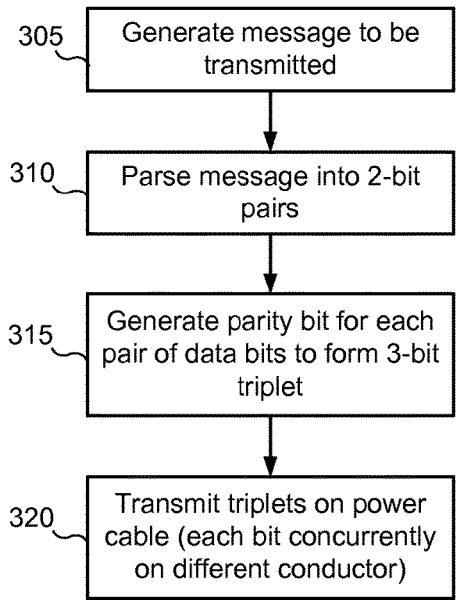
FIG. 3 is a flow diagram illustrating the basic steps for transmitting a message with forward error correction in accordance with one embodiment.
Figure 4:
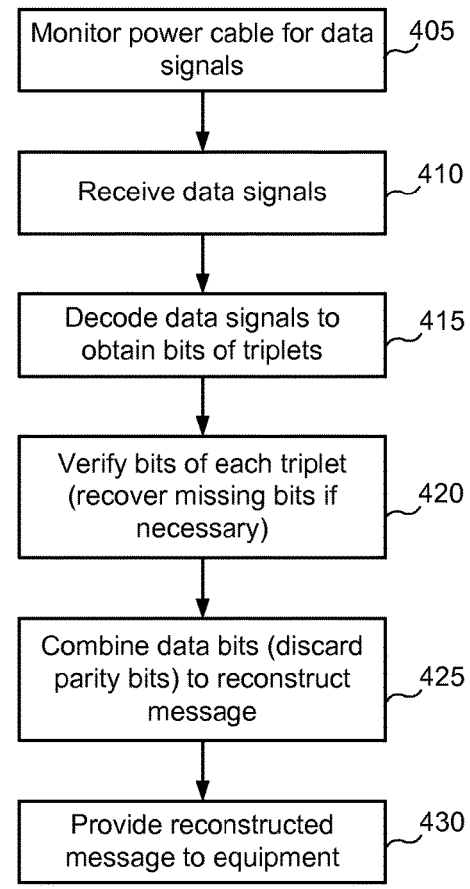
FIG. 4 is a diagram illustrating the basic steps for receiving this information and reconstructing the original message in accordance with one embodiment.

The operation of the system in this embodiment is summarized in the flow diagrams of FIGS. 3 and 4. FIG. 3 depicts the basic steps for transmitting a message with forward error correction, while FIG. 4 depicts the basic steps for receiving this information and reconstructing the original message. The illustrated methods are exemplary, and the steps may vary in alternative embodiments.

Referring to FIG. 3, a comms on power message to be communicated from one device to another is generated (Provide). This message is parsed into pairs of data bits (310). In other words, the first bit is paired with the second, the third bit is paired with the fourth, and so on. A parity bit is then generated for each pair of data bits (315). The pair of data bits and the associated parity bit form a triplet. The three bits of a triplet are concurrently transmitted over the power cable, with each bit being conveyed on a different phase conductor (320). The bits need not be transmitted at exactly at the same time, but should be transmitted within the same period, so that all three bits of one triplet are transmitted before the bits of a following triplet are transmitted.

Referring to FIG. 4, the three conductors of the power cable are monitored for transmitted data (405). When a triplet is transmitted over the power cable, the corresponding signals are received on the three phase conductors of the cable (410) and the three bits of the triplet are decoded (415). The three bits are examined and the validity of the bits is verified (it is confirmed that the parity bit is correct for the data bits) (420). If one of the bits is lost, the missing bit is recovered using the other two bits. The two data bits are then combined with the data bits of other received triplets to reconstruct the original comms on power message (425), and the reconstructed message is provided to the appropriate equipment (430).

As explained above, the present systems and methods transmit forward error correction information concurrently with a pair of data bits. Binary data can only have the value of 0 or 1. Taking two adjacent bits in a byte, or serial string, gives four unique bit patterns of 00, 01, 10, and 11. A parity bit can be generated to provide forward error correction which enables recovery from single-bit errors in the transmission or reception of the data. The parity bit is generated using binary addition of the two data bits. The parity bit can have values of 0 or 1, and is used to validate the integrity of a message (the corresponding two data bits.

When the parity is combined with the two data bits, four unique bit patterns can be formed: 000; 011; 101; and 110. These patterns are shown in Tables 1-A through 1-D below.

TABLE 1-A

| Phase | A | B | C | Message |
|---|---|---|---|---|
| Bit 0 | 0 | | | 0 |
| Bit 1 | | 0 | | 0 |
| Parity | | | 0 | 0 |

TABLE 1-B

| Phase | A | B | C | Message |
|---|---|---|---|---|
| Bit 0 | 0 | | | 0 |
| Bit 1 | | 1 | | 1 |
| Parity | | | 1 | 1 |

TABLE 1-C

| Phase | A | B | C | Message |
|---|---|---|---|---|
| Bit 0 | 1 | | | 1 |
| Bit 1 | | 0 | | 0 |
| Parity | | | 1 | 1 |

TABLE 1-D

| Phase | A | B | C | Message |
|---|---|---|---|---|
| Bit 0 | 1 | | | 1 |
| Bit 1 | | 1 | | 1 |
| Parity | | | 0 | 0 |

The unique patterns shown in Tables 1-A through 1-D are what allow the original two bits to be recovered in the event of the loss of any one bit. Even when one of the three bits is lost, the remaining bits correspond to only one of these four unique patterns. Tables 2-A through 2-L below show the decoding of messages when one of the three received bits is lost.

TABLE 2-A

| Phase | A | B | C | Received | Decoded |
|---|---|---|---|---|---|
| Bit 0 | X | | | | 0 |
| Bit 1 | | 0 | | 0 | 0 |
| Parity | | | 0 | 0 | 0 |

TABLE 2-B

| Phase | A | B | C | Received | Decoded |
|---|---|---|---|---|---|
| Bit 0 | 0 | | | 0 | 0 |
| Bit 1 | | X | | | 0 |
| Parity | | | 0 | 0 | 0 |

TABLE 2-C

| Phase | A | B | C | Received | Decoded |
|---|---|---|---|---|---|
| Bit 0 | 0 | | | 0 | 0 |
| Bit 1 | | 0 | | 0 | 0 |
| Parity | | | X | | 0 |

TABLE 2-D

| Phase | A | B | C | Received | Decoded |
|---|---|---|---|---|---|
| Bit 0 | X | | | | 1 |
| Bit 1 | | 1 | | 1 | 1 |
| Parity | | | 0 | 0 | 0 |

TABLE 2-E

| Phase | A | B | C | Received | Decoded |
|---|---|---|---|---|---|
| Bit 0 | 1 | | | 1 | 1 |
| Bit 1 | | X | | | 1 |
| Parity | | | 0 | 0 | 0 |

TABLE 2-F

| Phase | A | B | C | Received | Decoded |
|---|---|---|---|---|---|
| Bit 0 | 1 | | | 1 | 1 |
| Bit 1 | | 1 | | 1 | 1 |
| Parity | | | X | | 0 |

TABLE 2-G

| Phase | A | B | C | Received | Decoded |
|---|---|---|---|---|---|
| Bit 0 | X | | | | 1 |
| Bit 1 | | 0 | | 0 | 0 |
| Parity | | | 1 | 1 | 1 |

TABLE 2-H

| Phase | A | B | C | Received | Decoded |
|---|---|---|---|---|---|
| Bit 0 | 1 | | | 1 | 1 |
| Bit 1 | | X | | | 0 |
| Parity | | | 1 | 1 | 1 |

TABLE 2-I

| Phase | A | B | C | Received | Decoded |
|---|---|---|---|---|---|
| Bit 0 | 1 | | | 1 | 1 |
| Bit 1 | | 0 | | 0 | 0 |
| Parity | | | X | | 1 |

TABLE 2-J

| Phase | A | B | C | Received | Decoded |
|---|---|---|---|---|---|
| Bit 0 | X | | | | 0 |
| Bit 1 | | 1 | | 1 | 1 |
| Parity | | | 1 | 1 | 1 |

TABLE 2-K

| Phase | A | B | C | Received | Decoded |
|---|---|---|---|---|---|
| Bit 0 | 0 | | | 0 | 0 |
| Bit 1 | | X | | | 1 |
| Parity | | | 1 | 1 | 1 |

TABLE 2-L

| Phase | A | B | C | Received | Decoded |
|---|---|---|---|---|---|
| Bit 0 | 0 | | | 0 | 0 |
| Bit 1 | | 1 | | 1 | 1 |
| Parity | | X | | | 1 |

As an example, consider the case where two data bits of 0's are transmitted. The parity bit for the two 0's is also a 0. Placing the parity bit at the end of the data string (00) yields a three-bit string (a triplet) of 000. A one-bit error loss may result in a string of X00 being received, where X represents the missing or indecipherable bit. The two received bits would be pattern matched to one of the four valid bit patterns as shown in Table 2-A. Because only one of the valid patterns has 00 as the last two bits, it would be known that the original triplet was 000, which is the representation of the two data bits 00.

In another example, the two data bits to be conveyed are 10. The parity bit for this two-bit pair would be 1, so the resulting triplet is 101. If the second bit is lost in transmission, 1X1 would be received. This would be pattern matched to 101 (as shown by Table 2-H) and the original two data bits would be recovered as 10. If the third bit were lost in transmission instead of the second bit, the received bit string would be 10X. This would be pattern matched to 101, as shown by Table 2-I, and the original two data bits of 10 would be recovered.

Three phase AC power has three identical AC waveforms that are separated by a fixed time interval. Each waveform is 120° out of phase with the others. The voltage or current of a specific phase to ground is the same for all three phases, so there is no easy way to identify which of the conductors will have which of the phases or signals during installation of the power cable. Further, when the equipment is installed, it is not uncommon to splice together multiple segments of cable and then determine final connections by swapping phases at the surface until proper operation is obtained.

Since it is highly unlikely that the specific signal on each phase will be known, or when an error may occur, the system may be configured to automatically synchronize, or determine the correspondence between the bits and the phase conductors. For example, at start-up, a downhole gauge may transmit a known pattern of signals to the surface on all three phase conductors. Using pattern matching as shown in FIGS. 2-A through 2-L, the surface equipment can then determine from this known pattern which signal is on each phase. Alternately, a series of unique signals on each phase could be used to accomplish the same task. Either method allows communication to be established when the order of the signals and power cable is not known.

For example, a known sync pattern such as 01110111 (hex 0x77) could be transmitted. The first two bits (01) would be combined with a parity bit (1) to produce a three-bit string of 011. These bits would be transmitted on phases A, B and C (not necessarily in that order). For instance, phase A could have 1 on it, phase B could have 1, and phase C could have 0. The three possibilities for decoding these three bits (if the order of the phases is unknown) would be 110, 101, or 011. Since it is known that the first two bits should be 01, the receiving device would determine that phase C carries the first data bit. It would not, however, be able to determine which phase carries the second data bit or which carries the parity.

The second two bits (11) would then be combined with a parity bit (0) to produce a three-bit string of 110. These bits would be transmitted on the phase conductors in the same order as the bits of the first triplet. Phase A would have 1 on it, phase B would have 0, and phase C would have 1. When the surface equipment receives 110, it would verify phase C (with 1 on it) as carrying the first data bit. Then it can determine that phase A, which has a 1, carries the second data bit, while phase B, which has a 0, carries the parity bit. When it receives the next two triplets (011 and 110), it will verify that the correct phases are mapped to the correct bits.

If it had received 110 when expecting 011, it would know that it missed part of a transmission. Knowing that 110 is valid, it could determine that phase B was the parity. At the next repetition of 0x77, it would then verify phase B was the parity, determine that phase C is the first data bit, and determine that phase A was the second data bit.

Even if a phase does not have continuity and one bit is missing at start-up, the system can still determine the original data. At start-up, using the same phase order as before, if phase C is 0, phase B is 1, but phase A does not have a signal due to noise or a disconnect in the phase, the surface equipment can determine that for this transmission, a bit was not received. It can then rearrange the bits to be in the correct, expected order of 011. The surface equipment can determine that phase C is the first data bit, but cannot determine if phase B is the second data bit or the parity. When it should next receive 110, phase C is a 1, phase B is a 1, and nothing is on phase A, it can then determine that phase A is the parity bit. When the rest of the byte is received it will verify that it has mapped the correct bit to the correct phase. Since the surface equipment has determined there is a wiring error with the system, it can alert the operator and give details of the problem.

This same methodology applies when the downhole equipment is running before the surface equipment. If the equipment downhole is started before the surface equipment was turned on, or the surface equipment operation was interrupted, the surface equipment can still synchronize and decode the data. In this case, the surface equipment would have to recognize the start of a new transmission. Once it determines that a new transmission has started, it will use the above process and the start of the transmission to determine which bit is on which phase. Once an entire transmission has been received, it will verify that the checksum of the transmission is correct for the received data.

It should be noted that the foregoing examples do not specify a particular physical or electrical interface. Signals can be of any electrical type and can be transmitted over any medium. The information that is conveyed can be binary, analog, modulated, AC frequency, different AC frequencies, DC current, DC voltage, AC current, AC voltage, compressed, encoded, encapsulated, packetized, within a secure connection or tunnel, etc. This disclosure does not address the higher or lower level protocols that may be used. The signals transmitted over the different conductors do not have to be synchronized, but should be processed within the same time period.

The methodologies disclosed herein apply to both simplex and duplex communications from the surface to the downhole equipment, from the downhole equipment to the surface equipment, or two-way communications. These methodologies can be used for information transfer across segments of the system, or used for end-to-end communications.

Those of skill will further appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Similarly, the particular hardware or software components that are chosen to implement the described functionality may be selected to achieve specific design goals. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for communicating comms on power messages between surface equipment and downhole equipment in a well, the system comprising:
   surface equipment positioned at the surface of a well;
   downhole equipment positioned downhole in the well;
   a power cable coupled between the surface equipment and the downhole equipment,
      wherein the power cable has three conductors configured to transmit three-phase power from the surface equipment to the downhole equipment;
   at least one transmitter configured to
      parse a comms on power message into one or more data bit pairs,
      generate a parity bit for each of the one or more data bit pairs, thereby forming a triplet, and
      for each of the triplets, concurrently transmit the bits of the triplet over the power cable, wherein each of the bits are transmitted on separate conductors of the power cable;
   at least one receiver configured to
      for each of the transmitted triplets, decode the triplet and thereby identify the data bits of the triplet, and
      reconstruct the data bits of one or more triplets into the comms on power message.

2. The system of claim 1, wherein decoding the triplet comprises verifying that the triplet conforms to one of a set of predetermined patterns.

3. The system of claim 1, wherein decoding the triplet comprises recovering a lost bit and thereby conforming the triplet conforms to one of a set of predetermined patterns.

4. The system of claim 1, wherein the surface equipment comprises a control system at the surface of the well.

5. The system of claim 1, wherein the downhole equipment comprises a gauge package.

6. The system of claim 5, wherein the downhole equipment further comprises an electric submersible pump (ESP); wherein the ESP is powered by three-phase power transmitted from the surface equipment over the power cable.

7. The system of claim 6, wherein the surface equipment comprises a variable speed drive that generates three-phase power which is transmitted over the power cable to the ESP.

8. The system of claim 1, wherein the at least one transmitter includes a first one of the transmitters incorporated into the surface equipment and a second one of the transmitters incorporated into the downhole equipment; and wherein the at least one receiver includes a first one of the receivers incorporated into the surface equipment and a second one of the receivers incorporated into the downhole equipment; wherein the system is capable of bidirectional communications.

9. The system of claim 1, wherein the system is configured to synchronize the at least one transmitter and the at least one receiver prior to communicating the comms on power message.

10. The system of claim 9, wherein synchronizing the at least one transmitter and the at least one receiver comprises: the at least one transmitter transmitting one or more predetermined bit patterns on the three conductors of the power cable to the at least one receiver; and the at least one receiver decoding the predetermined bit patterns and determining based on the decoded predetermined bit patterns which of the three conductors carries a first data bit of each triplet, which of the three conductors carries a second data bit of each triplet, and which of the three conductors carries the parity bit of each triplet.

11. An apparatus for use in communicating comms on power messages between surface equipment and downhole equipment in a well, the apparatus comprising:
   a transmitter;
   wherein the transmitter is configured to be coupled to a three-phase power cable;
   wherein the transmitter is configured to
      receive a to-be-transmitted comms on power message,
      parse the to-be-transmitted comms on power message into one or more data bit pairs, and
      generate a parity bit for each of the one or more data bit pairs, thereby forming a triplet, for each of the triplets, concurrently transmit the bits of the triplet over the power cable, wherein each of the bits are transmitted on separate conductors of the power cable.

12. The apparatus of claim 11, wherein the apparatus comprises a transceiver that includes the transmitter and a receiver; wherein the receiver is configured to be coupled to the three-phase power cable, wherein the receiver is configured to: receive one or more triplets from the three-phase power cable; for each of the received triplets, decode the received triplet and identify the associated data bit pair; and reconstruct the data bit pairs of the received triplets into a received comms on power message.

13. The apparatus of claim 11, wherein the transmitter is configured to generate the parity bit by summing the data bits and using the least significant bit of the sum as the parity bit.

14. The apparatus of claim 11, wherein the transmitter is configured to transmit one or more predetermined bit patterns on the power cable prior to transmitting data associated with the comms on power message.

15. An apparatus for use in communicating comms on power messages between surface equipment and downhole equipment in a well, the apparatus comprising:

a receiver;

wherein the receiver is configured to be coupled to a three-phase power cable;

wherein the receiver is configured to receive triplets from the three-phase power cable, wherein each triplet includes a data bit pair and a parity bit, wherein for each of the triplets, the bits of the triplet are concurrently received on separate conductors of the power cable, for each of the received triplets, decode the triplet and thereby identify the data bit pair of the triplet, and reconstruct the data bit pairs of one or more triplets into a comms on power message.

16. The apparatus of claim 15, wherein the apparatus comprises a transceiver that includes the receiver and a transmitter; wherein the transmitter is configured to be coupled to the three-phase power cable, wherein the transmitter is configured to: receive a to-be-transmitted comms on power message; parse the to-be-transmitted comms on power message into one or more data bit pairs; generate a parity bit for each of the one or more data bit pairs, thereby forming a triplet; and for each of the triplets, concurrently transmit the bits of the triplet on separate conductors of the power cable.

17. The apparatus of claim 15, wherein decoding the triplet comprises verifying that the triplet conforms to one of a set of predetermined patterns.

18. The apparatus of claim 15, wherein decoding the triplet comprises recovering a lost bit and thereby conforming the triplet conforms to one of a set of predetermined patterns.

19. The apparatus of claim 15, wherein the receiver is configured to receive one or more predetermined bit patterns on three conductors of the power cable; decoding the predetermined bit patterns; and determining based on the decoded predetermined bit patterns which of the three conductors carries a first data bit of each triplet, which of the three conductors carries a second data bit of each triplet, and which of the three conductors carries the parity bit of each triplet.

* * * * *